United States Patent
Kawabata

(10) Patent No.: US 8,697,017 B2
(45) Date of Patent: Apr. 15, 2014

(54) METHOD AND DEVICE FOR PROCESSING EXHAUST GAS

(75) Inventor: Hirofumi Kawabata, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 546 days.

(21) Appl. No.: 13/062,071

(22) PCT Filed: Aug. 21, 2009

(86) PCT No.: PCT/JP2009/004023
§ 371 (c)(1), (2), (4) Date: Mar. 3, 2011

(87) PCT Pub. No.: WO2010/026708
PCT Pub. Date: Mar. 11, 2010

(65) Prior Publication Data
US 2011/0158878 A1    Jun. 30, 2011

(30) Foreign Application Priority Data
Sep. 8, 2008  (JP) .................. 2008-230093

(51) Int. Cl.
*B01D 53/34* (2006.01)
*B01D 53/68* (2006.01)

(52) U.S. Cl.
USPC ..................................... 423/210; 423/240 R

(58) Field of Classification Search
USPC ............... 423/210, 240 R; 422/168–170, 187
See application file for complete search history.

(56) References Cited

U.S. PATENT DOCUMENTS

| | | | | |
|---|---|---|---|---|
| 5,569,436 A | * | 10/1996 | Lerner | 422/170 |
| 5,607,654 A | * | 3/1997 | Lerner | 423/240 S |
| 2005/0084437 A1 | * | 4/2005 | Cox et al. | 423/243.01 |

FOREIGN PATENT DOCUMENTS

| | | | | |
|---|---|---|---|---|
| DE | 26 49 188 A1 | * 5/1977 | | B01D 53/14 |
| JP | 08-323133 A | * 12/1996 | | B01D 53/32 |
| JP | 2001-179051 A | * 7/2001 | | B01D 53/68 |
| JP | 2003-021315 A | * 1/2003 | | F23G 7/06 |
| JP | 2004-188411 A | * 7/2004 | | C02F 1/04 |
| JP | 2005-334755 | 12/2005 | | |
| JP | 2006-122863 A | * 5/2006 | | B01D 53/46 |
| JP | 2006-275307 A | * 10/2006 | | F23J 1/00 |

OTHER PUBLICATIONS

International Search Report for PCT/JP2009/004023, mailed Sep. 29, 2009.

* cited by examiner

*Primary Examiner* — Timothy Vanoy
(74) *Attorney, Agent, or Firm* — Nixon & Vanderhye P.C.

(57) ABSTRACT

An exhaust gas processing method of the present invention includes sequentially introducing an exhaust gas from a semiconductor manufacturing equipment to a combustion-based detoxifying device, a dust collector, and a two-stage gas cleaning device, so as to process the exhaust gas, wherein the two-stage gas cleaning device is comprised of a first-stage gas cleaning device and a second-stage gas cleaning device, and gas cleaning is performed in the first gas cleaning device that uses water as a cleaning solution and subsequently in the second gas cleaning device that uses an alkaline aqueous solution as a cleaning solution.

1 Claim, 1 Drawing Sheet

METHOD AND DEVICE FOR PROCESSING EXHAUST GAS

This application is the U.S. National Phase of International Application No. PCT/JP2009/004023, filed Aug. 21, 2009, which designated the U.S. and claims priority on Japanese Patent Application No. 2008-230093, filed Sep. 8, 2008, the entire contents of each of which are incorporated herein by reference.

TECHNICAL FIELD

The present invention relates to an exhaust gas processing method and an exhaust gas processing apparatus which remove harmful components in an exhaust gas discharged from a manufacturing equipment equipped with a thin film forming device using a CVD reaction, such as a semiconductor manufacturing equipment, a liquid crystal panel manufacturing equipment or a solar battery manufacturing equipment (hereinafter collectively referred to as a semiconductor manufacturing equipment in the present invention).

Priority is claimed on Japanese Patent Application No. 2008-230093, filed Sep. 8, 2008, the content of which is incorporated herein by reference.

BACKGROUND ART

FIG. 2 shows this kind of a conventional exhaust gas processing apparatus.

When a semiconductor manufacturing equipment 1 is in the film forming step, an exhaust gas mainly containing $SiH_4$ as a residual raw material gas is discharged from the semiconductor manufacturing equipment 1. Also, when the semiconductor manufacturing equipment 1 is in the cleaning step, an exhaust gas mainly containing $NF_3$ as the residual cleaning gas and $SiF_4$ produced by cleaning is discharged from the semiconductor manufacturing equipment 1.

The number of the semiconductor manufacturing equipment 1 is not limited to one and plural equipments may be sometimes provided. Sometimes, a portion of the equipments may be in the film forming step and others may be in the cleaning step.

The exhaust gas from the semiconductor manufacturing equipment 1 is transferred to a combustion-based detoxifying device 3 by a vacuum pump 2. In case plural semiconductor manufacturing equipments 1 and vacuum pumps 2 are provided, each exhaust gas from plural semiconductor manufacturing equipments 1 is transferred to the combustion-based detoxifying device 3 by each vacuum pump 2.

The combustion-based detoxifying device 3 delivers the above exhaust gas into flame formed by a burner such as an air burner or an oxygen burner thereby oxidizing and decomposing the above harmful components in the exhaust gas.

When the semiconductor manufacturing equipment 1 is in the film forming step, $SiH_4$ contained in the exhaust gas is converted into $SiO_2$ and $H_2O$ in the combustion-based detoxifying device 3. Also, when the semiconductor manufacturing equipment 1 is in the cleaning step, $NF_3$ contained in the exhaust gas is converted into HF and $NO_x$, while $SiF_4$ is converted into $SiO_2$ and HF in the combustion-based detoxifying device 3.

Therefore, the exhaust gas to be discharged from the combustion-based detoxifying device 3 contains $SiO_2$ and HF as a substance to be removed. This exhaust gas is then fed into a dust collector 4 such as a bag filter, where $SiO_2$ in the form of solid particles is collected.

In the case of collecting $SiO_2$ in the dust collector 4, $SiO_2$ in the form of solid particles is collected on a surface of a filter, and is gradually accumulated with inflow of the exhaust gas. Since the exhaust gas contains HF, a portion of this HF reacts with $SiO_2$ to produce a small amount of $SiF_4$ again.

The exhaust gas containing HF and $SiF_4$ from the dust collector 4 is sucked by a blower 5 and fed into a gas cleaning device 6. This gas cleaning device 6 is also called a wet type scrubber and causes gas-liquid contact between an alkali cleaning solution such as an aqueous sodium hydroxide solution, and an exhaust gas thereby removing. HF as an acidic gas and $SiF_4$. It is also possible to increase removal efficiency by optionally providing this gas cleaning device 6 with a two-stage constitution.

The gas exhaust gas to be discharged from the cleaning device 6 is diffused into the atmospheric air through a blower 7 after confirming that the content of a harmful component is reduced to the regulation value or less.

By the way, in such a processing method, $SiF_4$ in the exhaust gas is hydrolyzed to produce $SiO_2$ and HF in the gas cleaning device 6, and HF is converted into NaF through a reaction with sodium of an alkali cleaning solution. There is a disadvantage that since $SiO_2$ and NaF are solid substances, these substances adhere and accumulate to a filler inside the gas cleaning device 6, and the interior of a mist separator and a cleaning solution circulation pump, thus causing clogging of the gas cleaning device 6 and pump failure.

Therefore, in a conventional device, it was necessary to frequently overhaul a gas cleaning device 6 body and a circulation pump.

CITATION LIST

Patent Literature

[Patent Literature 1]
Japanese Unexamined Patent Application, First Publication No. 2004-188411
[Patent Literature 2]
Japanese Unexamined Patent Application, First Publication No. 2005-334755

SUMMARY OF INVENTION

Technical Problem

Therefore, an object in the present invention is to prevent adhesion and accumulation of a solid substance to the interior of a gas cleaning device and to prevent the occurrence of a disadvantage such as clogging of the gas cleaning device in the case of sequentially feeding an exhaust gas from a semiconductor manufacturing equipment into a combustion-based detoxifying device, a dust collector and the gas cleaning device.

Solution to Problem

In order to achieve such an object, a first aspect of the present invention provides:

an exhaust gas processing method comprising sequentially introducing an exhaust gas from a semiconductor manufacturing equipment to a combustion-based detoxifying device, a dust collector, and a two-stage gas cleaning device, so as to process the exhaust gas, wherein the two-stage gas cleaning device is comprised of a first-stage gas cleaning device and a second-stage gas cleaning device, and gas cleaning is performed in the first gas cleaning device that uses water as a cleaning solution and subsequently in the second gas cleaning device that uses an alkaline aqueous solution as a cleaning solution.

A second aspect of the present invention provides:

a exhaust gas processing apparatus including a combustion-based detoxifying device that burns and detoxify an exhaust gas from a semiconductor manufacturing equipment, a dust collector that removes a solid part in an exhaust gas from the combustion-based detoxifying device, and a two-stage gas cleaning device that cleans an exhaust gas from the dust collector, wherein the two-stage gas cleaning device is comprised of a first-stage gas cleaning device that uses water as a cleaning solution, and a second-stage gas cleaning device that uses an alkaline aqueous solution as a cleaning solution.

Advantageous Effects of Invention

According to the present invention, HF and $SiF_4$ in an exhaust gas to be introduced into a first-stage gas cleaning device are water soluble and are therefore well dissolved in a cleaning solution composed of water. The cleaning solution becomes strong acidic of pH 1 or lower by dissolution of HF. Therefore, $SiO_2$ produced by hydrolysis of $SiF_4$ is dissolved in a strong acidic cleaning solution and does not remain as a solid substance.

The exhaust gas, that is discharged from the first-stage gas cleaning device and then introduced into a second-stage gas cleaning device, is accompanied with moisture (steam) in a saturated state, and this moisture contains a trace amount of HF. This HF is neutralized by contacting with a cleaning solution composed of an aqueous alkali solution in the second-stage gas cleaning device, thereby converting into a trace amount of NaF. However, the amount of NaF produced is very small.

Therefore, the solid substance seldom adheres and accumulates to the interior of the first-stage or second-stage gas cleaning device or the interior of the circulation pump, resulting in clogging of the solid substance, and thus it is possible to reduce the number of overhaul.

DESCRIPTION OF EMBODIMENTS

Figure 1:
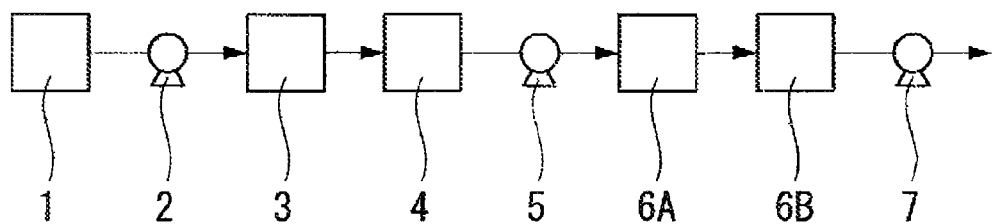
FIG. 1 is a schematic block flow diagram showing an example of an exhaust gas processing apparatus of the present invention.

FIG. 1 shows an example of a gas processing apparatus of the present invention. The same reference sign is used for a component identical to that of a conventional gas processing apparatus shown in FIG. 2, and the description is omitted.

In the gas processing apparatus of this example, the gas cleaning device has a two-stage series constitution that has a first-stage gas cleaning device 6A and a second-stage gas cleaning device 6B connected thereto in series, and differs from a conventional apparatus in that the cleaning solution of the first-stage gas cleaning device 6A is water and the cleaning solution of the second-stage gas cleaning device 6B is an aqueous alkali solution.

In the first-stage gas cleaning device 6A and the second-stage gas cleaning device 6B, a cylindrical wash column body is filled with a filler. There is used such a system in which a cleaning solution delivered from a shower at the upper portion of this filler by a circulation pump is sprayed and allowed to flow down, while an exhaust gas is transferred toward the filler from the lower portion of the filler by a fan, and then the both undergo counterflow gas-liquid contact in the filler.

As the cleaning solution of the first-stage gas cleaning device 6A, water at a normal temperature, such as city water or industrial water is used. The city water means water such as drinking water or tap water managed by Water Authority.

As the cleaning solution of the second-stage gas cleaning device 6B, an aqueous alkali solution at a normal temperature such as an aqueous sodium hydroxide solution having the concentration of 20 to 30% by weight is used.

A circulation flow rate of the cleaning solution is appropriately determined according to the flow rate of an exhaust gas to be introduced, the concentration of HF and the concentration of $SiF_4$ in the exhaust gas.

The exhaust gas from the dust collector 4 is introduced into the first-stage gas cleaning device 6A through a blower 5, where the exhaust gas is cleaned with a cleaning solution composed of water. Then, the cleaned exhaust gas is introduced into the second-stage gas cleaning device 6B disposed in series to the first-stage gas cleaning device 6A, where the exhaust gas is cleaned with a cleaning solution composed of an aqueous alkali solution and then diffused into the atmospheric air through a blower 7.

According to such a processing method, HF and $SiF_4$ in an exhaust gas to be introduced into a first-stage gas cleaning device 6A are water soluble and are therefore well dissolved in a cleaning solution of water. The cleaning solution becomes strong acidic of pH 1 or lower by dissolution of HF. Therefore, $SiO_2$ produced by hydrolysis of $SiF_4$ is dissolved in a strong acidic cleaning solution and does not remain as a solid substance.

The exhaust gas, that is discharged from the first-stage gas cleaning device 6A and then introduced into a second-stage gas cleaning device 6B, is accompanied with moisture in a saturated state, and this moisture contains a trace amount of HF. This HF is neutralized by contacting with an alkali cleaning solution in the second-stage gas cleaning device 6B, thereby converting into a trace amount of NaF. However, the amount of NaF produced is very small.

Therefore, the solid substance seldom adheres and accumulates to the interior of the first-stage or second-stage gas cleaning device 6A, 6B or the interior of the circulation pump, resulting in clogging of the solid substance, and thus it is possible to reduce the number of overhaul.

Examples

Hereinafter, specific examples are described.

Using an exhaust gas processing apparatus shown in FIG. 1, an exhaust gas from a semiconductor manufacturing equipment 1 was processed.

In case the semiconductor manufacturing equipment 1 is in the film forming step, a film-forming operation was carried out by introducing $SiH_4$ into the semiconductor manufacturing equipment 1 at a flow rate of 10 liters/min. In case the semiconductor manufacturing equipment 1 is in the cleaning step, a cleaning operation was carried out by introducing $NF_3$ into the semiconductor manufacturing equipment 1 at a flow rate of 15 liters/min.

The exhaust gas from the semiconductor manufacturing equipment 1 was processed by sequentially introducing into a combustion-based detoxifying device 3 and a dust collector 4, and then introduced into the second-stage gas cleaning device 6B from the first-stage gas cleaning device 6A.

Each processing air flow rate of the first-stage gas cleaning device 6A and the second-stage gas cleaning device 6B was adjusted to 200 m$^3$/min. Tap water at normal temperature was recycled as the cleaning solution of the first-stage gas cleaning device 6A, and an aqueous sodium hydroxide solution having the concentration of 25% by weight at a normal temperature was recycled as the cleaning solution of the second-stage gas cleaning device 6B.

A batch process by pH control was carried out in the first-stage gas cleaning device 6A, and a batch process by a use amount of the cleaning solution was carried out in the second-stage gas cleaning device 6B.

An exhaust gas processing apparatus was operated under the above operation conditions.

As a result, the frequency of overhaul of the first-stage gas cleaning device 6A was once per 12 months.

Figure 2:
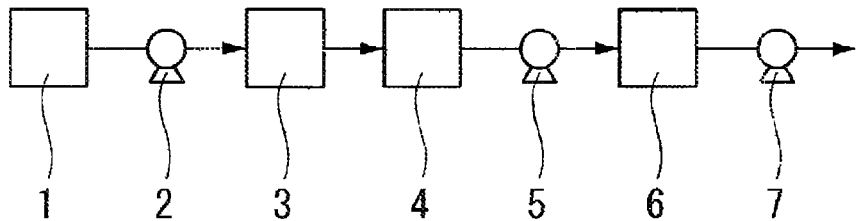
FIG. 2 is a schematic block flow diagram showing a conventional exhaust gas processing apparatus.

On the other hand, in a conventional gas processing apparatus shown in FIG. 2, a gas processing was carried out under the same operation conditions using an aqueous sodium hydroxide solution having the concentration of 25% by weight as the cleaning solution of a gas cleaning device 6. As a result, the frequency of overhaul of the gas cleaning device 6 was once per month.

REFERENCE SIGNS LIST

1 Semiconductor manufacturing equipment
3 Combustion-based detoxifying device
4 Dust collector
6A First-stage gas cleaning device
6B Second-stage gas cleaning device

The invention claimed is:

1. An exhaust gas processing method comprising sequentially introducing an exhaust gas from a semiconductor manufacturing equipment to a combustion-based detoxifying device, a dust collector, and a two-stage gas cleaning device, so as to process the exhaust gas, wherein the two-stage gas cleaning device is comprised of a first-stage gas cleaning device and a second-stage gas cleaning device, and gas cleaning is performed in the first gas cleaning device that uses water as a cleaning solution and subsequently in the second gas cleaning device that uses an alkaline aqueous solution as a cleaning solution.

* * * * *